United States Patent [19]

Schultz

[11] Patent Number: 5,552,932
[45] Date of Patent: *Sep. 3, 1996

[54] COLLAPSIBLE BINOCULAR

[76] Inventor: Cynthia A. Schultz, 302 Belin Manor Dr., Houston, Tex. 77024

[*] Notice: The term of this patent shall not extend beyond the expiration date of Pat. No. 5,353,151.

[21] Appl. No.: 316,924

[22] Filed: Oct. 3, 1994

Related U.S. Application Data

[63] Continuation-in-part of Ser. No. 44,228, Apr. 7, 1993, Pat. No. 5,353,151.

[51] Int. Cl.⁶ .................. G02B 27/02; G02B 27/22; G02B 23/00
[52] U.S. Cl. .................. 359/480; 359/408; 359/474; 359/817
[58] Field of Search .................. 359/404–409, 359/480–481, 474, 808, 811, 815–817, 503, 506–507, 511–512

[56] References Cited

U.S. PATENT DOCUMENTS

| 2,662,442 | 12/1953 | Gowland | 359/474 |
| 2,933,015 | 4/1960 | Somach | 359/474 |
| 4,239,328 | 12/1980 | Justice, Sr. et al. | 359/408 |
| 4,253,732 | 3/1981 | Carver | 359/474 |
| 4,268,111 | 5/1981 | Green et al. | 359/408 |
| 4,478,498 | 10/1984 | Ohno | 359/408 |
| 4,773,747 | 9/1988 | Bresnahan | 359/408 |
| 4,964,709 | 10/1990 | Hoeptner | 359/408 |
| 5,113,529 | 5/1992 | Carr | 2/13 |
| 5,353,151 | 10/1994 | Schultz et al. | 359/408 |

Primary Examiner—Thong Q. Nguyen

[57] ABSTRACT

A collapsible binocular comprising a substantially rectangular-faced open-sided housing having a front wall formed with a pair of objective lens apertures and a rear wall formed with a pair of eyepiece lens apertures is provided. A top wall, a bottom wall with an intermediate transverse fold line, the front wall and the rear wall of the housing are integrally connected and a flap is integrally connected to the front wall for attaching the front wall to under side of a visor extending from the top wall. A left side wall member and a right side wall member are integrally attached to the front wall or to the rear wall such that the front wall or the rear wall, respectively, play the role of a centered portion. When the binocular is assembled, any pairs of objective lens apertures will be in alignment with any pairs of eyepiece lens apertures.

12 Claims, 5 Drawing Sheets

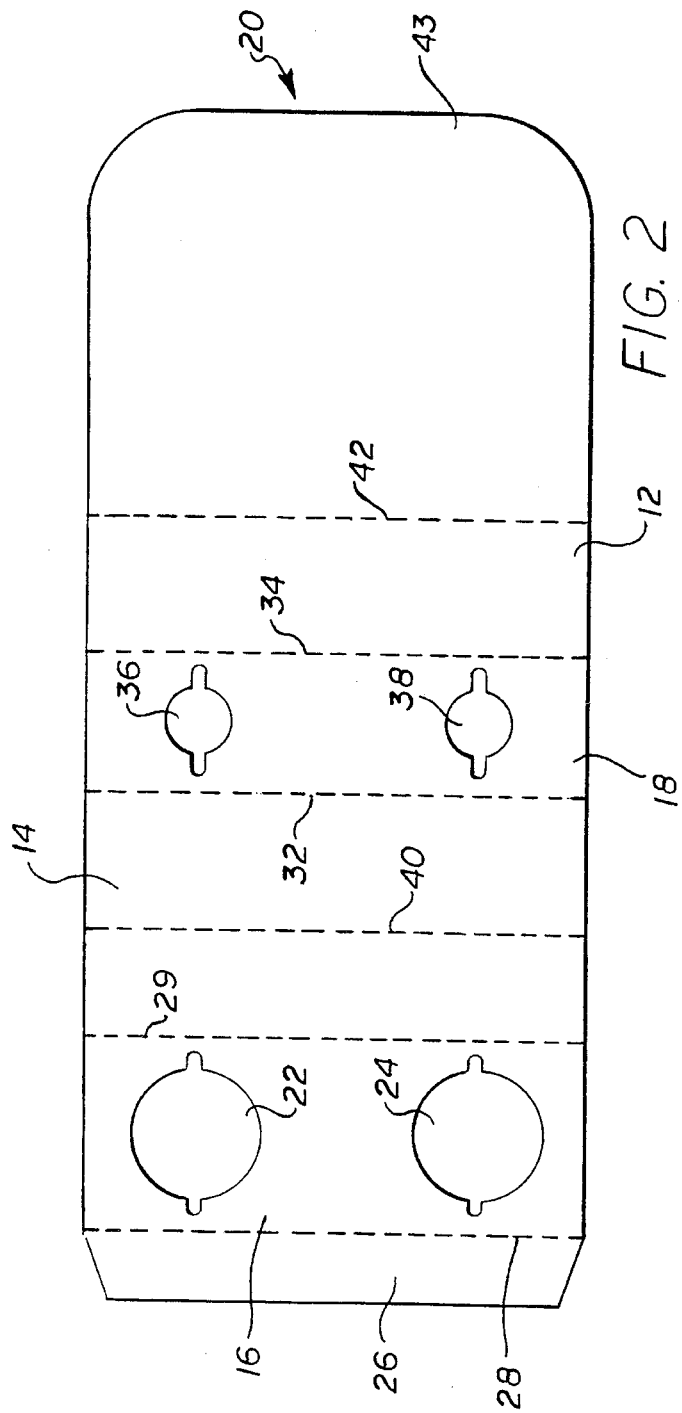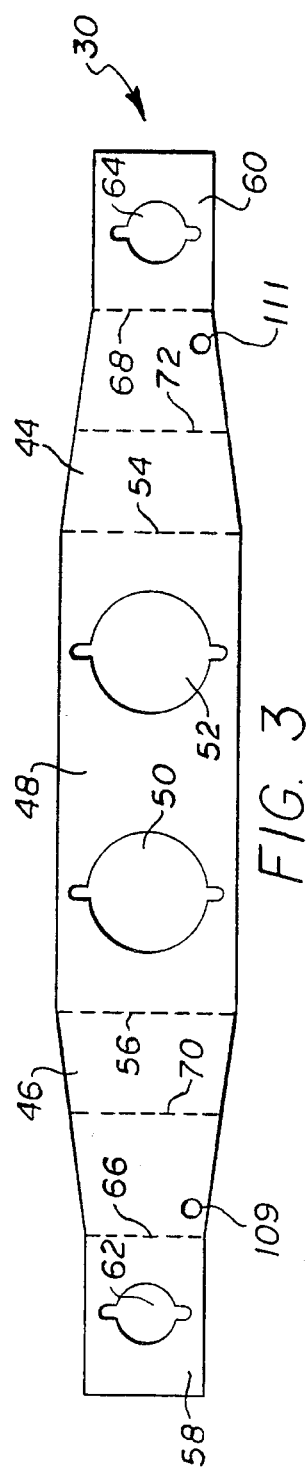

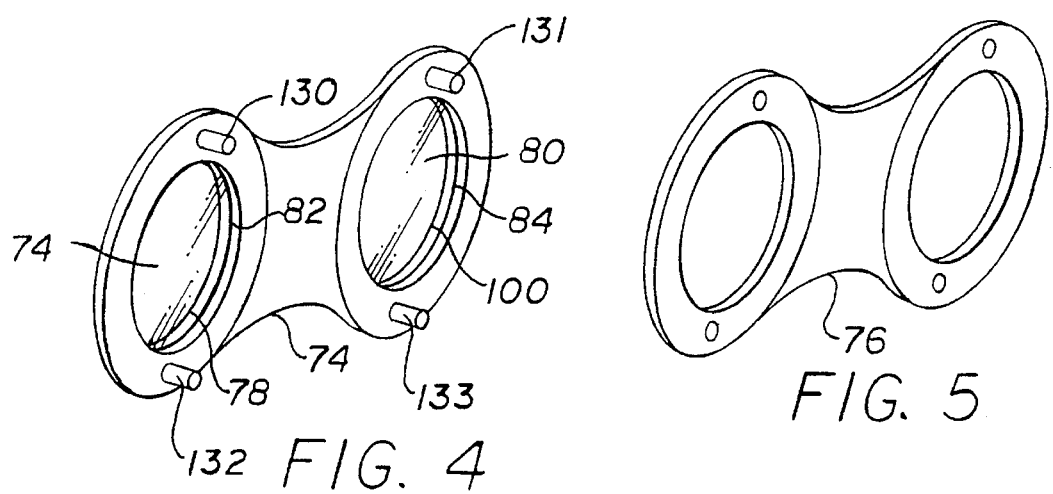
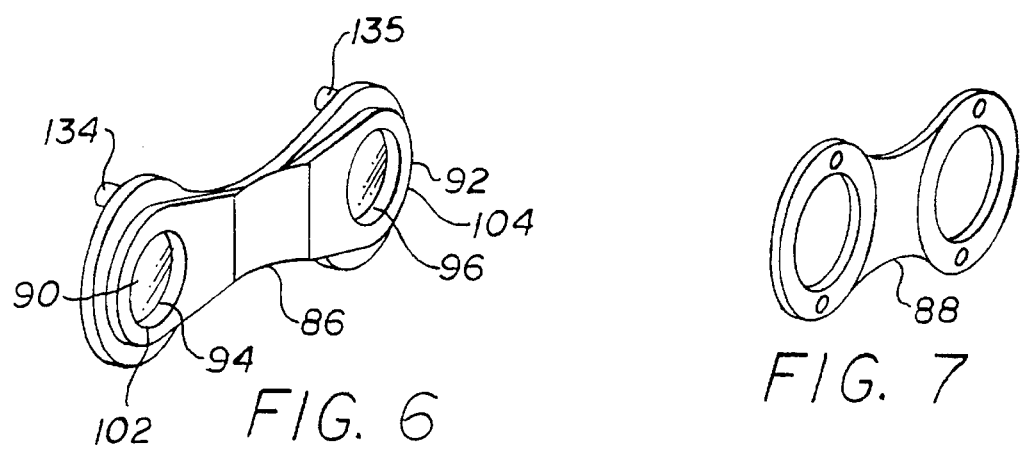
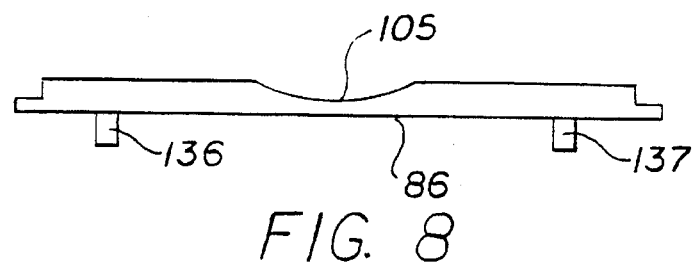

5,552,932

COLLAPSIBLE BINOCULAR

This application is a continuation-in-part of U.S. Pat. Ser. No. 08/044,228 entitled Collapsible Binocular, filed Apr. 7, 1993, and issued Oct. 4, 1994, as U.S. Pat. No. 5,353,151.

FIELD OF THE INVENTION

The present invention relates generally to the field of optical instruments, and more particularly, to a collapsible binocular that fits into a pocket or other small space when collapsed.

BACKGROUND AND SUMMARY OF THE INVENTION

Collapsible binoculars may be used at sporting events, concerts, operas, amusement parks and the like to enhance the view of distant objects. Such binoculars have highly practical characteristics and are generally inexpensive.

Collapsible and foldable binoculars are known in the prior art. Disadvantages, however, exist with the prior art binoculars. Many of the binoculars in the prior art are formed from a single blank having complicated fold arrangements to enable the binocular to be collapsed. Some of the binoculars, when collapsed, leave the lenses unprotected, and therefore, the lenses are easily scratched or damaged. The lenses are also unprotected when the binocular is being used. Other types of collapsible binoculars are not suited for convenient storage. The lenses of the binocular disclosed in U.S. Pat. No. 4,268,111 protrude from the collapsed body and therefore, the binocular is not completely flat when collapsed or folded. Protruding lenses add cumbersome bulk to the binocular when it is collapsed, and are also more likely to be broken or damaged. The disadvantage of unprotected lenses has been overcome in U.S. Pat. No. 4,239,328, and U.S. Pat. No. 4,478,498 by providing a case in which to store the folded binocular when it is not in use. In order to fit into the case, the binoculars have narrowly spaced fold lines which reduce the overall strength and durability of the binocular. Furthermore, the case must be stored or held when the binocular is being used.

In U.S. Pat. No. 4,964,709, a visor which folds over the objective lens to protect the lenses is provided. A large number of fold lines are required to enable collapsing and folding the binocular, which make the binocular unsturdy. The collapsible binocular of U.S. Pat. No. 4,773,747 has modified visors on both the front and rear walls to protect the lenses. The visor on the front wall, however, prevents properly positioning the eyes near the eyepiece lenses.

According to the present invention, there is provided a collapsible binocular comprising a substantially rectangular-faced open-sided housing having a front wall formed with a pair of objective lens apertures and a rear wall formed with a pair of eyepiece lens apertures. A top wall, a bottom wall, the front wall, and the rear wall of the housing are integrally connected, and a flap is integrally connected to the front wall for attaching the front wall to under side of a visor extending from the top wall and passing the front wall. The bottom wall has an intermediate transverse fold line. There is also an elongated side wall member, having a centered portion formed with a pair of objective lens apertures, and a left side wall member and a right side wall member integrally connected to a left side wall member end and a right side wall member end, respectively. The left side wall member end and the right side wall member end each have an eyepiece lens aperture. The elongated side wall member is affixed to the housing by an objective lens means and an eyepiece lens means such that the objective lens means and the eyepiece lens means are positioned in the pair of objective lens apertures and in the pair of eyepiece lens apertures, respectively. The left side wall member and the right side wall member may be integrally attached to the front wall or to the rear wall such that the front wall or the rear wall, respectively, plays role of a centered portion. The objective lens means comprises a pair of objective lenses, a unitary objective lens case and a unitary objective lens case clip. The eyepiece lens means comprises a pair of eyepiece lenses, a unitary eyepiece lens case and a unitary eyepiece lens case clip. The unitary objective lens case and the unitary eyepiece lens case and the unitary objective lens case clip and the unitary eyepiece lens case clip are flexible and add durability and strength to the binocular. The unitary objective lens case and the unitary eyepiece lens case and the unitary objective lens case clip and the unitary eyepiece lens case clip also protect the lenses when the binocular is being used and when the binocular is collapsed and not in use. When the present invention is assembled, the pair of objective lens apertures of the housing will be in alignment with the pair of objective lens apertures of the elongated side wall member and the pair of eyepiece lens apertures of the housing will be in alignment with the pair of eyepiece lens apertures of the elongated side wall member so as to place the two pairs of eyepiece lens apertures in coincidence and in longitudinal alignment with the two pairs of objective lens apertures. Fold lines on the housing and on the elongated side wall member define the front wall, the rear wall, the top wall, the bottom wall, the left side wall member, the right side wall member, the flap and the visor. Said fold lines enable collapsing the housing and the elongated side wall member binocular from a fixed position to a collapsed position.

The present invention also provides a second embodiment and a third embodiment of the collapsible binocular. In the second embodiment and the third embodiment, the substantially rectangular-faced open-sided housing is designed as before. The second embodiment and the third embodiment carry changes in the elongated side wall member. Attachment of the elongated side wall member to the substantially rectangular-faced open sided housing as an integral part of the housing establishes the major uniqueness in the second embodiment and in the third embodiment. The centered portion of the elongated side wall member is shared with and formed by the front wall in the third embodiment or by the rear wall in the second embodiment of the housing of the binocular. The left side wall member and the right side wall member extend out from sides of the front wall, in the third embodiment, or from sides of the rear wall, in the second embodiment, of the housing. In the third embodiment, where the front wall of the housing serves as the centered portion of the elongated side wall member, one eyepiece lens aperture is placed on the left side wall member end and another eyepiece lens aperture is placed on the right side wall member end. On the other hand, in the second embodiment, where the rear wall of the housing serves as the centered portion of the elongated side wall member, one objective lens aperture is placed on the left side wall member end and another objective lens aperture is placed on the right side wall member end. Thus, due to sharing of the centered portion, in the third embodiment only one pair of objective lens apertures is used and in the second embodiment only one pair of eyepiece lens apertures is used, requiring less material for formation of the binocular. Also, in the third embodiment of the collapsible binocular, usage of the front wall as the centered portion deletes any need for alignment of objective lens apertures of the front wall with other objective lens apertures. Similarly, in the second embodiment of the binocular, usage of the rear wall as the centered portion deletes any need for alignment of eyepiece lens apertures of the rear wall with other eyepiece lens apertures.

It is an object of the present invention to provide a collapsible binocular which overcomes the disadvantages of the configurations described in previous patents.

It is another object of this invention to provide a collapsible binocular wherein the pair of eyepiece lenses and pair of objective lenses are protected when the binocular is in use or being stored.

It is another object of this invention to provide a collapsible binocular wherein the lenses are held by a unitary objective lens case and a unitary eyepiece lens case and a unitary objective lens case clip and a unitary eyepiece lens case clip which add durability and strength to the body of the binocular.

These and other objects, advantages and features of the present invention will be apparent to those skilled in the art from reading the specification including the attached drawings and appended claims.

BRIEF DESCRIPTION OF THE DRAWING

FIG. 2 is a plan view of a blank to be folded into the open-sided housing of the present invention;

FIG. 3 is a plan view of an elongated side wall member, having a centered portion with a pair of objective lens apertures and a left side wall member and a right side wall member each having an eyepiece lens aperture, of the present invention;

FIG. 4 is a perspective view of the objective lens case of the present invention;

FIG. 5 is a perspective view of the objective lens case clip of the present invention;

FIG. 6 is a perspective view of the eyepiece lens case of the present invention;

FIG. 7 is a perspective view of the eyepiece lens case clip of the present invention;

FIG. 8 is a side view of the eyepiece lens case of FIG. 6;

DETAILED DESCRIPTION OF THE PREFERRED EMBODIMENT

Figure 1A:
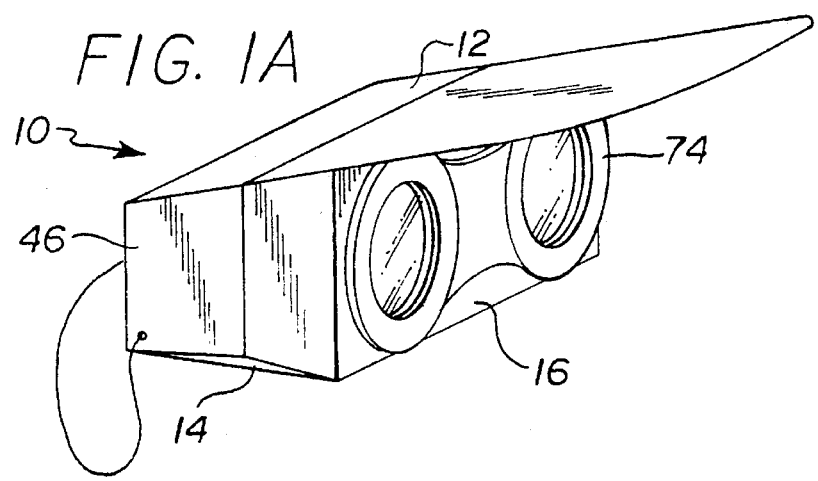
FIG. 1a is a front perspective view of the preferred embodiment of the present invention.
Figure 1B:
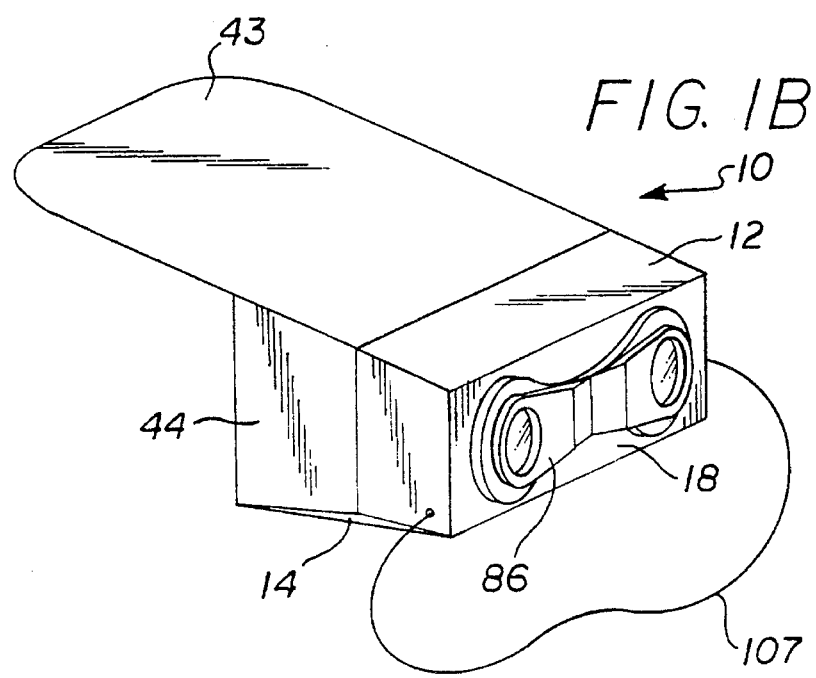
FIG. 1b is a rear perspective view of the preferred embodiment of the present invention.

Referring to the drawings, FIG. 1a shows a front perspective view of a collapsible binocular of the present invention in its expanded state, ready for use and generally designated 10. FIG. 1b shows a rear perspective view of the binocular 10 in its expanded state. A top wall 12, a bottom wall 14, a front wall 16, and a rear wall 18 of the binocular 10 are formed from a blank 20 shown in plan view in FIG. 2. A unitary objective lens case 74 is shown in FIG. 1a.

Blank 20 shown in FIG. 2, when assembled, forms a substantially rectangular-faced open-sided housing and a visor 43. The front wall 16 is formed with a pair of objective lens apertures 22 and 24, and is integral with a flap 26 along a fold line 28. The flap 26 is affixed to the under side of the visor 43 extending from the top wall 12 and passing the front wall 16 when the binocular 10 is assembled. The bottom wall 14 is integral with the lower edge of the front wall 16 at fold line 29 and with the lower edge of the rear wall 18 at fold line 32. The rear wall 18 is formed with a pair of eyepiece lens apertures 36 and 38. Preferably, the rear wall 18 will be narrower than the front wall 16 to provide a streamline, tapered appearance when the binocular 10 is assembled. The rear wall 18 is integral with the top wall 12 at fold line 34. The top wall 12 and the visor 43 together are substantially longer than the bottom wall 14 and extend beyond the front wall 16 when the binocular 10 is assembled. The visor 43 shields objective lenses from excessive light and glare. Further, the visor 43, as well as any remainder of the blank 20, provide a substantial surface for displaying advertisements, designs or other art work or messages on the binocular 10. The bottom wall 14 is formed with an intermediate transverse fold line 40. The top wall 12 is integral with the visor 43 at fold line 42.

FIG. 3 shows an elongated side wall member 30 which, when assembled with the blank 20, forms a left side wall member 44 and a right side wall member 46. A centered portion 48 is formed with a pair of objective lens apertures 50 and 52. The centered portion 48 is integral with the left side wall member 44 and the right side wall member 46 at fold lines 54 and 56, respectively. A right side wall member end 58 is formed with an eyepiece lens aperture 62 and a left side wall member end 60 is formed with another eyepiece lens aperture 64. The right side wall member end 58 is integral with the right side wall member 46 along fold line 66. The left side wall member end 60 is integral with the left side wall member 44 at fold line 68. The left side wall member 44 is formed with a lateral fold line 72 and the right side wall member 46 is formed with a lateral fold line 70.

When the binocular is assembled, the centered portion 48 between the left side wall member 44 and the right side wall member 46 will be adjacent to interior surface of the front wall 16 so that the pair of objective lens apertures 50 and 52 of the elongated side wall member 30 are aligned with the pair of objective lens apertures 24 and 22 of the housing. The right side wall member end 58 and the left side wall member end 60 will be adjacent to the interior surface of the rear wall 18 of the housing so that the eyepiece lens apertures 62 and 64 of the right side wall member end 58 and of the left side wall member end 60, respectively, are aligned with the pair of eyepiece lens apertures 38 and 36 of the rear wall 18 of the housing, respectively. The eyepiece lens apertures 62 and 64 of the pair of side wall member ends 58 and 60, respectively, and the pair of eyepiece lens apertures 38 and 36 of the rear wall 18 are arranged in coincidence and in longitudinal alignment with the pair of objective lens apertures 24 and 22 of the housing and the pair of objective lens apertures 50 and 52 of the elongated side wall member 30. The flap 26 is adhesively secured using an adhesive strip or glue to the under side of the visor 43 extending from the top wall 12 such that the rear wall 18 and the front wall 16 are parallel. Securing the flap 26 to the under side of the visor 43 extending from the top wall 12 fixes the optical length for the collapsible binocular 10.

It is preferred that the blank 20 and the elongated side wall member 30 are made from a semi-rigid material. Particularly suitable is chipboard, which may be readily folded and scored to provide integral connections in the positions of the fold lines 28, 29, 32, 34, 54, 56, 66, and 68, as described above. Alternate embodiments may be made from cardboard or a suitable plastic material. The assembly of the collapsible binocular 10 of the present invention is simplified over those known in the art, and therefore, may be assembled quickly and at a lower production cost. The use of the separate blank 20 and the elongated side wall member 30 enhances durability of the binocular 10 while simplifying the production and manufacturing of the binocular 10. The substantial surface of the visor 43 and of any remainder of the blank 20 enables the production of binoculars 10 having complicated, multi-colored designs on the visor 43, on the top wall 12 and on any remainder of the blank 20.

An objective lens means is attached to the front wall 16 and the centered portion 48. The objective lens means comprises a pair of objective lenses 78 and 80, the unitary objective lens case 74 (shown in FIG. 1a and FIG. 4), and a unitary objective lens case clip 76. The unitary objective lens case 74 with the pair of objective lenses 78 and 80 are shown in FIG. 4. The unitary objective lens case clip 76 is shown in FIG. 5. The pair of objective lenses 78 and 80 rest on shoulders 82 and 84 of the unitary objective lens case 74. The pair of objective lenses 78 and 80 are preferably made from glass or from plastic lenses. The pair of objective lenses 78 and 80 are slightly greater in diameter than the pair of objective lens apertures 22 and 24 such that the pair of objective lenses 78 and 80 are pressed against the periphery of the pair of objective lens apertures 22 and 24, respectively, when the unitary objective lens case 74 is in position against the front wall 16. A ridge 98 surrounds the surface of objective lens 78 and a ridge 100 surrounds the surface of objective lens 80. Ridges 98 and 100 provide a protective barrier around the pair of objective lenses 78 and 80, respectively, that protects the pair of objective lenses 78 and 80, respectively, from damage and scratching when the binocular 10 is in use as well as when the binocular 10 is collapsed and not in use. In the preferred embodiment of the invention, the unitary objective lens case clip 76 snap fits onto the unitary objective lens case 74 at pins 130, 131, 132, and 133, and secures the centered portion 48 of the elongated side wall member 30 to the front wall 16.

An eyepiece lens means is attached to the rear wall 18 and to the right side wall member end 58 and to the left side wall member end 60. The eyepiece lens means comprises a pair of eyepiece lenses 90 and 92, a unitary eyepiece lens case 86, and a unitary eyepiece lens case clip 88. The unitary eyepiece lens case 86 with the pair of eyepiece lenses 90 and 92 are shown in FIG. 6. The unitary eyepiece lens case clip 88 is shown in FIG. 7. The pair of eyepiece lenses 90 and 92 rest on shoulders 94 and. 96, respectively, of the unitary eyepiece lens case 86. The pair of eyepiece lenses 90 and 92 are preferably made from glass to provide greater optical qualities than most plastic lenses do. The pair of eyepiece lenses 90 and 92 are slightly greater in diameter than the pair of eyepiece lens apertures 36 and 38, respectively, such that the pair of eyepiece lenses 90 and 92 are pressed against the periphery of the pair of eyepiece lens apertures 36 and 38 when the unitary eyepiece lens case 86 is in position against the exterior surface of the rear wall 18. Similarly to the ridges 98 and 100 on the unitary objective lens case 74, ridges 102 and 104 provide a protective barrier around the pair of eyepiece lenses 90 and 92, respectively, that protects the pair of eyepiece lenses 90 and 92, respectively, from damage and scratching when the binocular 10 is in use as well as when the binocular 10 is collapsed and not in use. In the preferred embodiment of the invention, the unitary eyepiece lens case clip 88 snap fits onto the unitary eyepiece lens case 86 at pins 134 and 135 seen in FIG. 6, and 136 and 137 seen in FIG. 8, and secures the side wall member ends 58 and 60 to the rear wall 18. FIG. 8, shows a side view of the unitary eyepiece lens case 86. The unitary eyepiece lens case 86 is formed to have a depression 105 for accommodating the bridge of the nose of a user of the binocular 10. The depression 105 allows the user to comfortably place the binocular 10 near the eyes at the desired location for viewing through the binocular 10. The depression 105 and the unitary eyepiece lens case 86 and the unitary eyepiece lens case clip 88 allow the user to maintain a constant interpupillary distance when viewing distant objects.

The unitary eyepiece lens case 86, the unitary objective lens case 74, the unitary eyepiece lens case clip 88 and the unitary objective lens case clip 76 are composed of durable and flexible elastomer materials, including but not limited to neoprene polymer, and/or of acrylonitrile butadiene styrene polymers (A.B.S. plastic) and are of unitary construction. Elastomer materials and A.B.S. plastic are durable and strong, and enable the binocular 10 of this invention to be used repeatedly without coming apart or losing its ability to be fixed and collapsed. Elastomer materials may have colors and or scents, such as pina colada, strawberry, for example, added during preparation so that alternate embodiments of the invention may have a unitary eyepiece lens case 86 and a unitary objective lens case 74 and a unitary eyepiece lens case clip 88 and a unitary objective lens case clip 76 of various combinations of color and odor. The unitary eyepiece lens case 86 and the unitary objective lens case 74 and the unitary eyepiece lens case clip 88 and the unitary objective lens case clip 76 hold the side walls in place, provide strength and durability to the binocular 10 and protection to the pair of eyepiece lenses 90 and 92 and to the pair of objective lenses 78 and 80. The useful life of the binocular 10 is also increased by the unitary eyepiece lens case 86 and the unitary objective lens case 74 and the unitary eyepiece lens case clip 88 and the unitary objective lens case clip 76.

Figure 9:
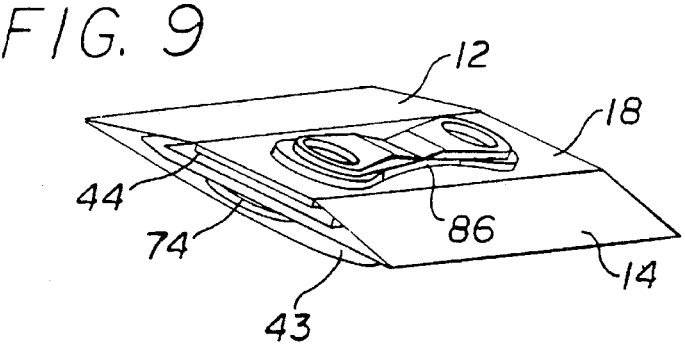
FIG. 9 is a perspective view showing the present invention in a collapsed position.

FIG. 9 shows the binocular 10 in the collapsed position. The binocular 10 may be readily collapsed by applying pressure on the rear wall 18 and on the visor 43 to urge the rear wall 18 and the visor 43 together. When pressure is applied as indicated, the top wall 12 and the bottom wall 14 deflect outwardly away from each other and bend along the fold line 42 and along the intermediate transverse fold line 40, respectively, (refer to FIG. 2). Simultaneously, the left side wall member 44 and the right side wall member 46(as shown on FIG. 3) deflect inward at lateral fold lines 72 and 70, respectively (as shown on FIG. 3). When the binocular 10 is collapsed, the visor 43 covers the pair of objective lenses 78 and 80 in the unitary objective lens case 74, providing extra protection to the pair of objective lenses 78 and 80. The collapsed binocular 10 has a very thin profile and may be inserted into a pocket or other small space. Alternatively, the binocular 10 may be carried around the neck by a looping, flexible handle 107 shown in FIG. 1b. In the preferred embodiment, the handle 107 is an elasticized string mounted to the binocular 10 at openings 109 and 111, shown in FIG. 3.

Figure 10:
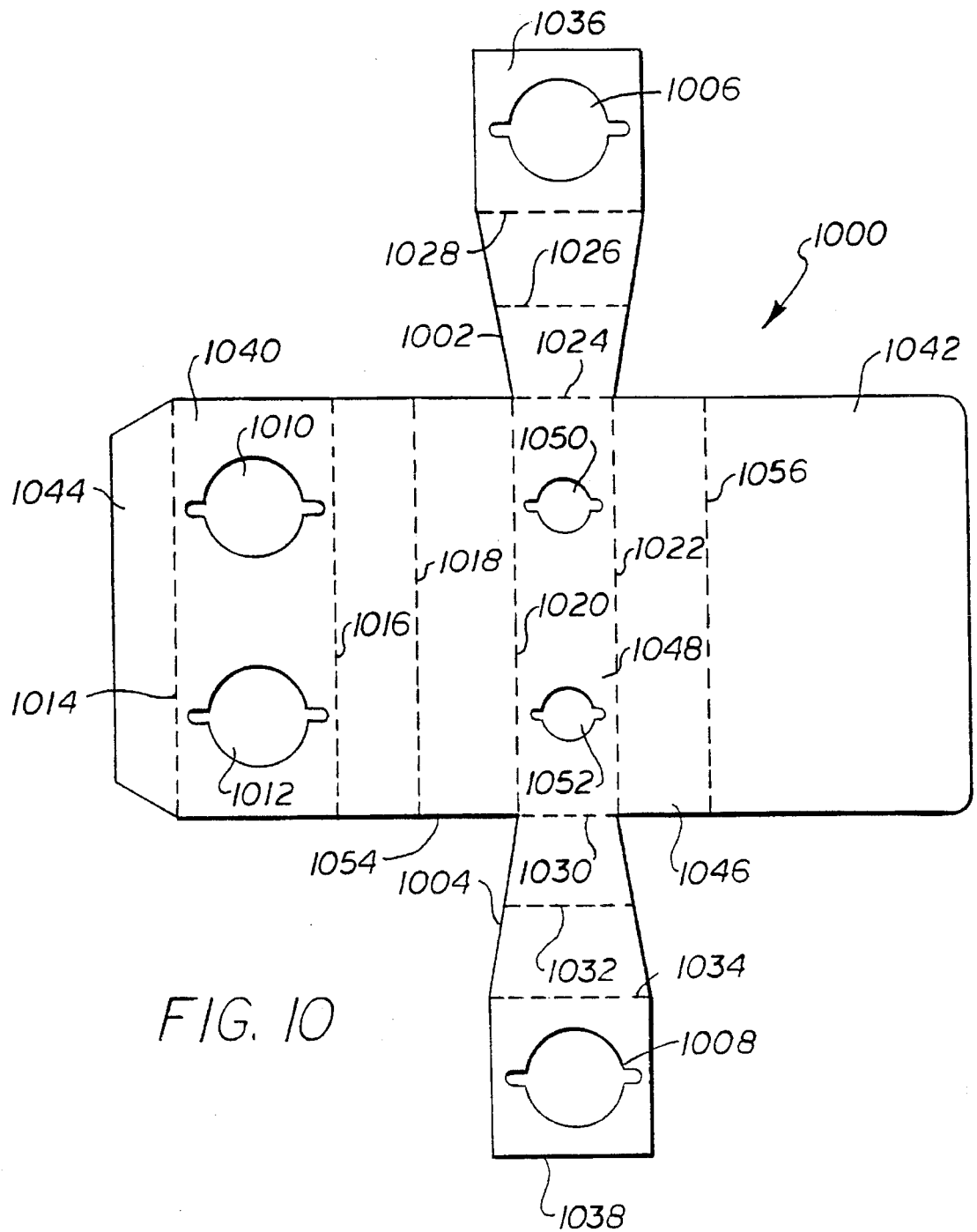
FIG. 10 is a plan view of a blank to be folded into a second embodiment of the present invention.

A blank 1000 shown in FIG. 10 is a second preferred embodiment of the present invention. Blank 1000 includes an attached right side wall member 1002 and an attached left side wall member 1004 which are integral with a rear wall 1048. The attached right side wall member 1002 includes an objective lens aperture 1006 at an attached right side wall member end 1036. The attached left side wall member 1004 includes an objective lens aperture 1008 at an attached left side wall member end 1038. The attached right side wall member 1002 and the attached left side wall member 1004 of the blank 1000 will have dimensions similar to dimensions of the right side wall member 46 and of the left side wall member 44, respectively, already described for the collapsible binocular 10 of FIG. 3 and when assembled will be similar in appearance to the collapsible binocular 10 shown in FIG. 1a and FIG. 1b.

The binocular 10 is assembled in a manner similar to that already described by the folding along a number of fold lines 1014, 1016, 1020, and 1022 to form a substantially rectangular-faced, open-sided housing with a visor 1042. A flap 1044 is affixed to the under side of the visor 1042 extending from a top wall 1046 using an adhesive strip or glue. The visor 1042 extending from the top wall 1046 extends beyond a front wall 1040. The attached right side wall member 1002 is folded along fold line 1024 and is integral with the rear wall 1048 at the fold line 1024. The attached right side wall member 1002 is also folded along a fold line 1028, and turned in to the housing such that the objective lens aperture 1006 of the attached right side wall member 1002 is aligned with an objective lens aperture 1010 of the front wall 1040. The attached left side wall member 1004 is folded along a fold line 1030 and is integral with the rear wall 1048 at the fold line 1030. The attached left side wall member 1004 is also folded along a fold line 1034, and turned in to the housing such that the objective lens aperture 1008 of the attached left side wall member 1004 is aligned with an objective lens aperture 1012 of the front wall 1040. The attached right side wall member end 1036 and the attached left side wall member end 1038 will be adjacent to the interior surface of the front wall 1040.

The objective lens means described above is attached to the front wall 1040 over a pair of objective lens apertures 1010 and 1012 that are aligned with the objective lens aperture 1006 on the attached right side wall member 1002 and with the objective lens aperture 1008 on the attached left side wall member 1004, respectively. The eyepiece lens means described above is attached to the rear wall 1048 over a pair of eyepiece lens apertures 1050 and 1052. The collapsible binocular comprising blank 1000 is similar in appearance to the binocular shown in FIG. 9 when in the collapsed state. When the embodiment shown in FIG. 10 is collapsed, the top wall 1046 and a bottom wall 1054 will deflect outwardly and away from each other. The bottom wall 1054 will bend along an intermediate transverse fold line 1018. The top wall 1046 is integral with the visor 1042 at fold line 1056 and will bend along fold line 1056 such that the visor 1042 covers the front wall 1040, thus protecting the objective lens means from scratches and damages. The attached right side wall member 1002 and the attached left side wall member 1004 deflect inward at lateral fold lines 1026 and 1032, respectively. The visor 1042 covers the pair of objective lenses as already described upon bending of the visor 1042 along fold line 1056.

Figure 11:
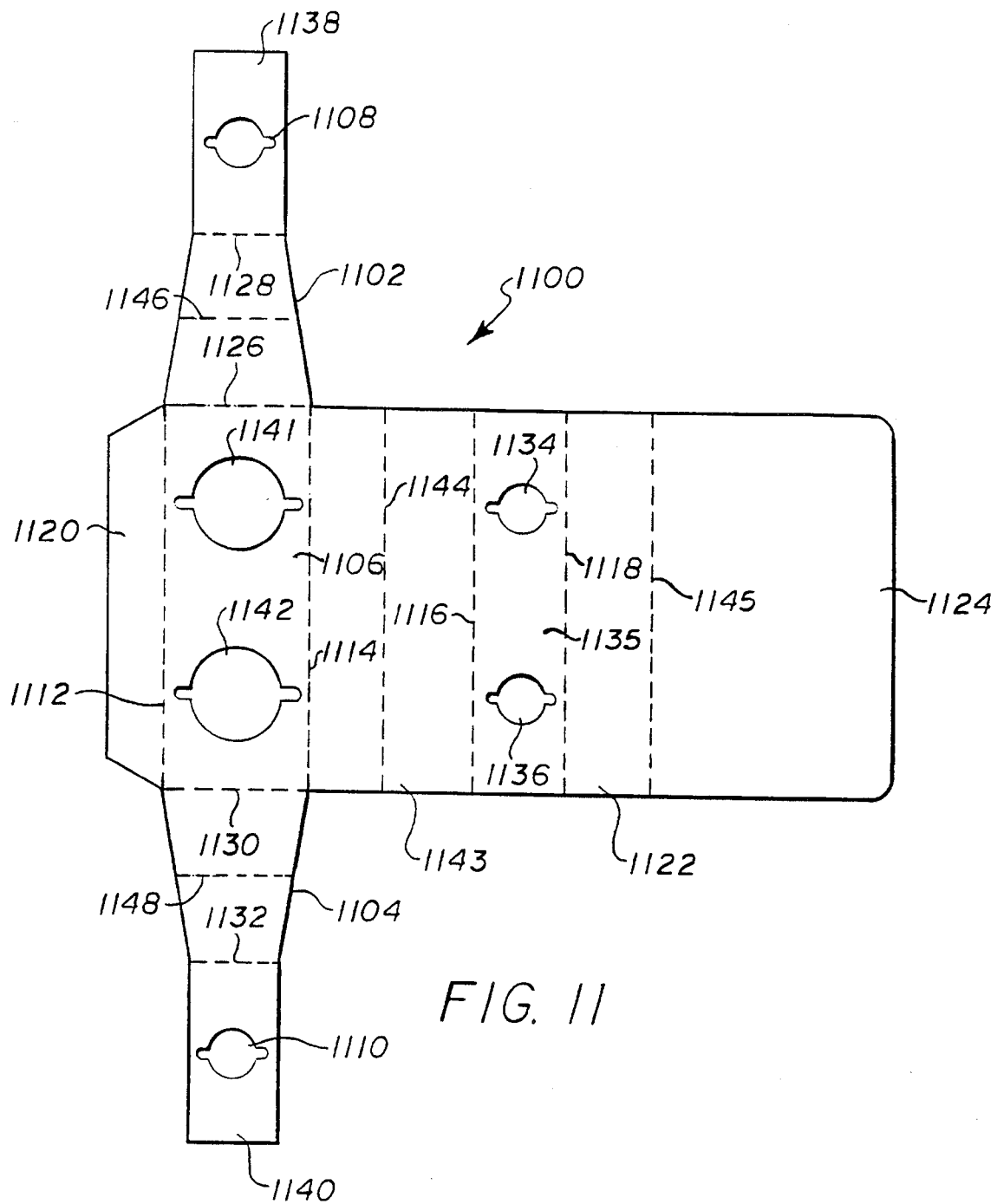
FIG. 11 is a plan view of a blank to be folded into a third embodiment of the present invention.

FIG. 11 shows a blank 1100, a third embodiment of the present invention. The blank 1100 includes an attached right side wall member 1102 and an attached left side wall member 1104 which are integral with a front wall 1106. The attached right side wall member 1102 includes an eyepiece lens aperture 1108 at an attached right side wall member end 1138. The attached left side wall member 1104 includes an eyepiece lens aperture 1110 at an attached left side wall member end 1140. The blank 1100 will have dimensions similar to those already described for other embodiments and when assembled will be similar in appearance to the collapsible binocular 10 shown in FIG. 1a and FIG. 1b.

The binocular 10 is assembled in a manner similar to that already described by folding along fold lines 1112, 1114, 1116, and 1118 to form a substantially rectangular-faced open-sided housing with a visor 1124. A flap 1120 is affixed to the under side of the visor 1124 extending from a top wall 1122 using an adhesive strip or glue such that the front wall 1106 runs parallel to a rear wall 1135. The visor 1124 extending from the top wall 1122 extends beyond the from wall 1106. The attached right side wall member 1102 is folded along a fold line 1126 and is integral with the front wall 1106 at the fold line 1126. The attached right side wall member 1102 is also folded along a fold line 1128, and turned in to the housing such that the eyepiece lens aperture 1108 of the attached right side wall member 1102 is aligned with an eyepiece lens aperture 1134 of the rear wall 1135. The attached left side wall member 1104 is folded along a fold line 1130 and is integral with the front wall 1106 at the fold line 1130. The attached left side wall member 1104 is also folded along a fold line 1132, and turned in to the housing such that the eyepiece lens aperture 1110 of the attached left side wall member 1104 is aligned with an eyepiece lens aperture 1136 of the rear wall 1135. The attached right side wall member end 1138 and the attached left side wall member end 1140 will be adjacent to the interior surface of the rear wall 1135.

The objective lens means already described is attached to the front wall 1106 over a pair of objective lens apertures 1141 and 1142, as previously described. The eyepiece lens means described above is attached to the rear wall 1135 over a pair of eyepiece lens apertures 1134 and 1136 that are aligned with the eyepiece lens aperture 1108 on the attached right side wall member 1102 and with the eyepiece lens aperture 1110 on the attached left side wall member 1104, respectively. The collapsible binocular 10 comprising the blank 1100 is similar in appearance to the binocular 10 shown in FIG. 9 when in the collapsed state. When the embodiment shown in FIG. 11 is collapsed, the top wall 1122 and a bottom wall 1143 will deflect outwardly and away from each other. The bottom wall 1143 will bend along an intermediate transverse fold line 1144. The top wall 1122 is integral with the visor 1124 at fold line 1145 and will bend along the fold line 1145 such that the visor 1124 covers the front wall 1106, thus protecting the objective lens means from scratches and damages. The attached right side wall member 1102 and the attached left side wall member 1104 deflect inward at lateral fold lines 1146 and 1148, respectively. The visor 1124 covers the pair of objective lenses as already described upon bending of the visor 1124 along the fold line 1145. In the second embodiment, only one pair of eyepiece lens apertures 1050 and 1052 are used. In the third embodiment, only one pair of objective lens apertures 1141 and 1142 are used. Thus, in comparison to the original most preferred embodiment shown in FIG. 2 and FIG. 3, less material is required for formation of the binocular 10 by utilizing the front wall 1106 (as shown in FIG. 11) or the rear wall 1048 (as shown in FIG. 10) as the centered portion 48 of the elongated side wall member 30 used in the most preferred embodiment. In addition, in the third embodiment of the binocular 10, usage of the front wall 1106 as the centered portion deletes any need for alignment of the pair of objective lens apertures 1141 and 1142 of the front wall 1106 with any other objective lens apertures. Similarly, in the second embodiment of the binocular 10, usage of the rear wall 1048 as the centered portion deletes any need for alignment of the pair of eyepiece lens apertures 1050 and 1052 of the rear wall 1048 with any other eyepiece lens apertures. As a result, due to simplification of alignment of objective lens apertures 1141 and 1142 in the third embodiment and of eyepiece lens apertures 1050 and 1052 in the second embodiment, setting up of the binocular 10 is simplified and made less time consuming.

From the foregoing it will be seen that this invention is one well adapted to attain all of the ends and objects hereinabove set forth, together with other advantages which are obvious and which are inherent to the apparatus and structure.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A collapsible binocular comprising:

a substantially rectangular-faced open-sided housing being formed from a blank and having a front wall formed with a pair of objective lens apertures and with an upper edge and a lower edge, a rear wall formed with a pair of eyepiece lens apertures and with an upper edge and a lower edge, a bottom wall integrally connected to the lower edge of the rear wall and to the lower edge of the front wall, a top wall integrally connected to the upper edge of the rear wall, with a visor being integrally connected to the top wall via a fold line and extending from the top wall beyond the front wall, a flap integrally connected to the upper edge of the front wall for attaching the visor to the front wall such that the front wall and the rear wall are parallel to each other when the binocular is in a fixed position, with said lower edges and said upper edges defining fold lines and with the bottom wall having an intermediate transverse fold line;

a left side wall member and a right side wall member being attached to and integral with the housing and being foldable, with the left side wall member being integrally connected to a left side wall member end having an aperture and the right side wall member being integrally connected to a right side wall member end having an aperture, and the left side wall member and the right side wall member each having a lateral fold line and said left side wall member and said right side wall member being connected to one another through a centered portion with apertures;

an objective lens means comprising a pair of objective lenses, a unitary objective lens case and a unitary objective lens case clip for providing strength and durability attached to the front wall such that the objective lenses cover the objective lens apertures, and an eyepiece lens means comprising a pair of eyepiece lenses, a unitary eyepiece lens case and a unitary eyepiece lens case clip for providing strength and durability attached to the rear wall such that the eyepiece lenses cover the pair of eyepiece lens apertures, and the fold lines enabling collapsing the binocular from an extended position to a collapsed position, during which the top and bottom walls move relatively apart and the front and rear walls move relatively toward each other whereby the visor folds over the objective lens means.

2. The collapsible binocular of claim 1, wherein the rear wall is narrower than the front wall.

3. The collapsible binocular of claim 1, wherein the unitary objective lens case and the unitary objective lens case clip are comprised of neoprene polymer in order to enable the binocular to be used repeatedly without coming apart or losing the ability to be fixed and collapsed and to protect the lenses, thus increasing life of the binocular.

4. The collapsible binocular of claim 1, wherein the unitary eyepiece lens case and the unitary eyepiece lens case clip are comprised of neoprene polymer in order to enable the binocular to be used repeatedly without coming apart or losing the ability to be fixed and collapsed and to protect the lenses, thus increasing life of the binocular.

5. The collapsible binocular of claim 1, wherein the substantially rectangular-faced open-sided housing and the attached left side wall member and the attached right side wall member are formed from a semi-rigid material.

6. The collapsible binocular of claim 5, wherein the semi-rigid material is chipboard.

7. The collapsible binocular of claim 5, wherein the semi-rigid material is cardboard.

8. The collapsible binocular of claim 5, wherein the semi-rigid material is sheet plastic.

9. The collapsible binocular of claim 1, wherein the unitary eyepiece lens case and the unitary eyepiece lens case clip are comprised of acrylonitrile butadiene styrene polymer which is durable and strong, enabling the binocular to be used repeatedly without coming apart or losing its ability to be fixed and collapsed, and which protects the lenses and increases useful life of the unitary eyepiece lens case and of the unitary eyepiece lens case clip.

10. The collapsible binocular of claim 1, wherein the unitary objective lens case and the unitary objective lens case clip are comprised of acrylonitrile butadiene styrene polymer which is durable and strong, enabling the binocular to be used repeatedly without coming apart or losing its ability to be fixed and collapsed, and which protects the lenses and increases useful life of the unitary objective lens case and of the unitary objective lens case clip.

11. The collapsible binocular of claim 1, wherein the right side wall member end and the left side wall member end include an objective lens aperture each, with the centered portion between the left side wall member and the right side wall member including a pair of eyepiece lens apertures, such that upon assembling of the collapsible binocular, the pair of eyepiece lens apertures of the rear wall is aligned with the pair of objective lens apertures of the front wall and with the pair of objective lens apertures of the right side wall member end and the left side wall member end.

12. The collapsible binocular of claim 1, wherein the right side wall member end and the left side wall member end include an eyepiece lens aperture each, with the centered portion between the left side wall member and the right side wall member including a pair of objective lens apertures, such that upon assembling of the collapsible binocular, the pair of objective lens apertures of the front wall is aligned with the pair of eyepiece lens apertures of the rear wall and with the pair of eyepiece lens apertures of the right side wall member end and the left side wall member end.

* * * * *